US 6,721,323 B1

(12) United States Patent
Giszczynski et al.

(10) Patent No.: US 6,721,323 B1
(45) Date of Patent: Apr. 13, 2004

(54) DISTRIBUTED VIRTUAL PATH

(75) Inventors: Eugene F. Giszczynski, Naperville, IL (US); James K. Thomas, Westford, MA (US); Eric Peterson, Naperville, IL (US); Dale A. Scholtens, Stickney, IL (US); Michael J. Wurst, Oswego, IL (US)

(73) Assignee: Tellab Operations, Inc., Naperville, IL (US)

( * ) Notice: Subject to any disclaimer, the term of this patent is extended or adjusted under 35 U.S.C. 154(b) by 0 days.

(21) Appl. No.: 09/332,491

(22) Filed: Jun. 14, 1999

(51) Int. Cl.$^7$ ............................................... H04L 12/56
(52) U.S. Cl. ........................ 370/395.1; 370/236.2
(58) Field of Search ............................ 370/222, 223, 370/224, 404, 405, 406, 424, 216, 395.1, 236.2; 455/13.2

(56) References Cited

U.S. PATENT DOCUMENTS

| 5,115,426 A | 5/1992 | Spanke ........................ 370/60 |
| 5,115,427 A | 5/1992 | Johnson, Jr. et al. ......... 370/60 |
| 5,274,643 A | 12/1993 | Fisk ............................ 370/94.1 |
| 5,280,470 A | 1/1994 | Buhrke et al. ................ 370/13 |
| 5,280,476 A | 1/1994 | Kojima et al. ............. 370/60.1 |
| 5,287,347 A | 2/1994 | Spanke ........................ 370/60 |
| 5,392,280 A | 2/1995 | Zheng ......................... 370/60 |
| 5,414,698 A | 5/1995 | Adams ......................... 370/17 |
| 5,425,101 A * | 6/1995 | Woo et al. ..................... 380/23 |
| 5,434,852 A | 7/1995 | La Porta et al. ............ 370/58.2 |
| 5,463,620 A | 10/1995 | Sriram ......................... 370/60 |
| 5,467,349 A * | 11/1995 | Huey et al. ................... 370/397 |
| 5,473,679 A | 12/1995 | La Porta et al. ............. 379/201 |
| 5,483,527 A | 1/1996 | Doshi et al. ................ 370/60.1 |
| 5,517,495 A | 5/1996 | Lund et al. .................... 370/60 |
| 5,528,763 A | 6/1996 | Serpanos ..................... 395/250 |
| 5,539,744 A | 7/1996 | Chu et al. ...................... 370/60 |
| 5,544,161 A | 8/1996 | Bigham et al. ............ 370/58.1 |
| 5,548,587 A | 8/1996 | Bailey et al. .............. 370/60.1 |
| 5,600,645 A * | 2/1997 | Boyer et al. ................. 370/395 |
| 5,689,499 A * | 11/1997 | Hullett et al. ................ 370/235 |
| 5,765,098 A * | 6/1998 | Bella .......................... 455/13.3 |
| 5,812,532 A * | 9/1998 | Oki et al. ..................... 370/255 |
| 5,920,558 A * | 7/1999 | Saito et al. .................. 370/359 |
| 5,930,250 A * | 7/1999 | Klok et al. ................... 370/352 |
| 5,953,338 A * | 9/1999 | Ma et al. ...................... 370/395 |
| 6,038,594 A * | 3/2000 | Puente et al. ................ 709/217 |
| 6,295,283 B1 * | 9/2001 | Falk ............................ 370/325 |
| 6,538,987 B1 * | 3/2003 | Cederone et al. ........... 370/216 |

* cited by examiner

*Primary Examiner*—Kenneth Vanderpuye
(74) *Attorney, Agent, or Firm*—McAndrews, Held & Malloy, Ltd.

(57) ABSTRACT

The present invention that provides a network topology for an ATM network. The topology includes a source network element, at least one intermediate network element, and a distributed virtual path connecting the source network element and the intermediate network elements. The distributed virtual path includes a virtual circuit that originates from the source network element and a virtual circuit that originates from at least one of the intermediate network elements. The distributed virtual path originates from the source network element and may terminate on a destination network element or on the source network element (thereby forming a ring). The network elements may be, for example, computers, satellites or other communications devices.

10 Claims, 2 Drawing Sheets

DISTRIBUTED VIRTUAL PATH

BACKGROUND OF THE INVENTION

The present invention generally relates to asynchronous transfer mode (ATM) networks. In particular, the present invention relates to ATM networks that allow new virtual circuits to be introduced into virtual paths at intermediate network elements rather than only at a source network element.

ATM networks can provide substantial performance increases over more traditional time division multiplexing (TDM) networks (also known as synchronous transfer mode or STM networks). This is especially true when the networks must carry many different types of information (e.g., data, voice, and video). Information travelling over an ATM network is coded into 53-byte cells. The first 5 bytes of each cell are the cell header and contain important information about the cell, including the routing information (i.e., destination address) for the cell.

One of the main concepts of the ATM protocol is the virtual path. A virtual path represents a set of physical connections assigned to carry cells that share higher-order address bits. Virtual paths contain one or more virtual circuits. A virtual circuit represents a set of physical connections assigned to carry cells that share lower-order address bits. A virtual path may generally be thought of as a bundle of one or more virtual circuits.

Another important concept within the ATM protocol is the quality of service (QoS). A QoS class defines parameters that represent a minimal level of network performance for the traffic carried by links that are designated as providing that particular QoS. Thus, for any two network elements within a network, there may need to be as many links (virtual paths and virtual circuits) set up between them as there are QoS classes defined for that network.

When performing bandwidth allocation, network elements within an ATM network will perform statistical multiplexing with respect to a given virtual path. That is, bandwidth allocation is performed using statistical probabilities determined from historic usage information. The statistical multiplexing performance of a given network element is inversely proportional to the number of virtual paths incident upon that network element. Put another way, as bandwidth fragmentation increases at a given network element, the statistical multiplexing ability of that network element decreases.

FIG. 1 shows an arrangement of virtual paths within an ATM network 100 connecting network elements 102, 104, 106 and 108. The figure also shows virtual paths 110, 112, and 114, as well as virtual circuits 116, 118 and 120.

The virtual paths 110, 112 and 114 contain a number of virtual circuits, such as the virtual circuits 116, 118 and 120, respectively. In the arrangement of virtual paths shown in FIG. 1, there is one virtual path defined between a source network element 102 and each of the possible destination network elements 104, 106 and 108. After a virtual path, such as the virtual path 114, leaves a source network element, such as the network element 102, it may pass through one or more intermediate network elements, such as the network elements 104 and 106, as it continues to a destination network element, such as the network element 108.

Note that a network element may be an intermediate network element with respect to some virtual paths, but not with respect to other virtual paths. A network element is an intermediate network element with respect to a virtual path if that virtual path passes through that network element but does not originate or terminate at that network element. In the past, the intermediate network elements only switched virtual paths that passed through them. In other words, in past ATM networks the intermediate network elements did not add or remove virtual circuits to virtual paths.

Consider data originating at the network element 102. In order to send data from the network element 102 to any of the other three network elements shown in FIG. 1, there must be three virtual paths defined. The first virtual path 110 begins at the network element 102 and terminates at the network element 104 (it has no intermediate network elements). The second virtual path 112 begins at the network element 102, passes through network element 104 (which is an intermediate network element with respect to this virtual path), and then terminates at the network element 106. The third virtual path 114 begins at the network element 102, passes through the network elements 104 and 106 (both of which are intermediate network elements with respect to this virtual path), and then terminates at the network element 108. Each of the virtual paths 110, 112 and 114, may also be used to carry data backward from the destination network elements 104, 106 and 108 (respectively) to the source network element 102.

In this scheme, bandwidth management may be handled by the source network element of the virtual path (for example the network element 102 with respect to the virtual path 114). This may be done because the source network element 102 knows how much of the bandwidth assigned to the virtual path 114 is being used at any given time. Allowing the source network element to manage bandwidth provides for relatively simple bandwidth management. Alternatively, the destination network element of the virtual path may handle the bandwidth management (for example the network element 108 with respect to the virtual path 114). Allowing the destination network element 108 to manage bandwidth is slightly more complex because the destination network element 108 must signal backward to the source network element 102 when the virtual path 114 is carrying its maximum allotted bandwidth. This backward signaling would be necessary to prevent the source network element 102 from sending more cells than may be received by the destination network element 108 over the virtual path 114.

One problem with the conventional arrangement of virtual paths is the large number of virtual paths required to fully connect the network elements within the network. The number of virtual paths required to fully connect the network elements using past ATM techniques is nonlinear, being given by $X*(N*(N-1))/2$, where X is the number of QoS classes defined for the network and N is the number of network elements in the network. Even for moderately sized networks, where N may be on the order of one hundred, conventional arrangements of virtual paths may lead to a great deal of administrative complexity.

Another problem created by past virtual path arrangements is the fragmentation of bandwidth among the many virtual paths. Given the large number of network elements to be interconnected (and assuming a uniform community of interest amongst network elements) each virtual path is allocated a relatively small amount of the total bandwidth. The effect is to greatly reduce the amount of statistical multiplexing possible by any network element. The number of virtual paths running between each pair of adjacent network elements is $X*N*(N-1)/2$. As a result, since each virtual path is allocated a relatively small amount of the bandwidth at any given network element, the ability of that network element to perform statistical multiplexing is greatly reduced.

Yet another problem with past arrangements of virtual paths is inefficient call setup when the network elements are arranged in a ring topology. In order to set up a call between two network elements it is necessary to check bandwidth availability between each pair of network elements along the path from the source network element to the destination network element. This hop-by-hop approach to call setup is extremely inefficient.

The presence of these and other problems in past arrangements of virtual paths within ATM networks demonstrates that a need has long existed for an improved arrangement of virtual paths within an ATM network.

SUMMARY OF THE INVENTION

It is an object of the present invention to provide a new type of virtual path within an ATM network.

Another object of the present invention is to reduce the number of virtual paths required to fully connect the network elements of an ATM network, thereby simplifying bandwidth allocation and network administration.

Still another object of the present invention is to provide an arrangement of virtual paths within an ATM network that increases the effectiveness of statistical multiplexing within the network elements.

Yet another object of the present invention is to provide an arrangement of virtual paths within an ATM network that simplifies call setup.

One or more of the foregoing objects are met in whole or in part by a preferred embodiment of the present invention that provides a network topology for an ATM network. The topology includes a source network element, at least one intermediate network element, and a distributed virtual path connecting the source network element and the intermediate network elements. The distributed virtual path includes a virtual circuit that originates from the source network element and a virtual circuit that originates from at least one of the intermediate network elements. The distributed virtual path originates from the source network element and may terminate on a destination network element or on the source network element (thereby forming a ring) The network elements may be, for example, computers, satellites or other communications devices.

DETAILED DESCRIPTION OF THE PREFERRED EMBODIMENT

Figure 2:
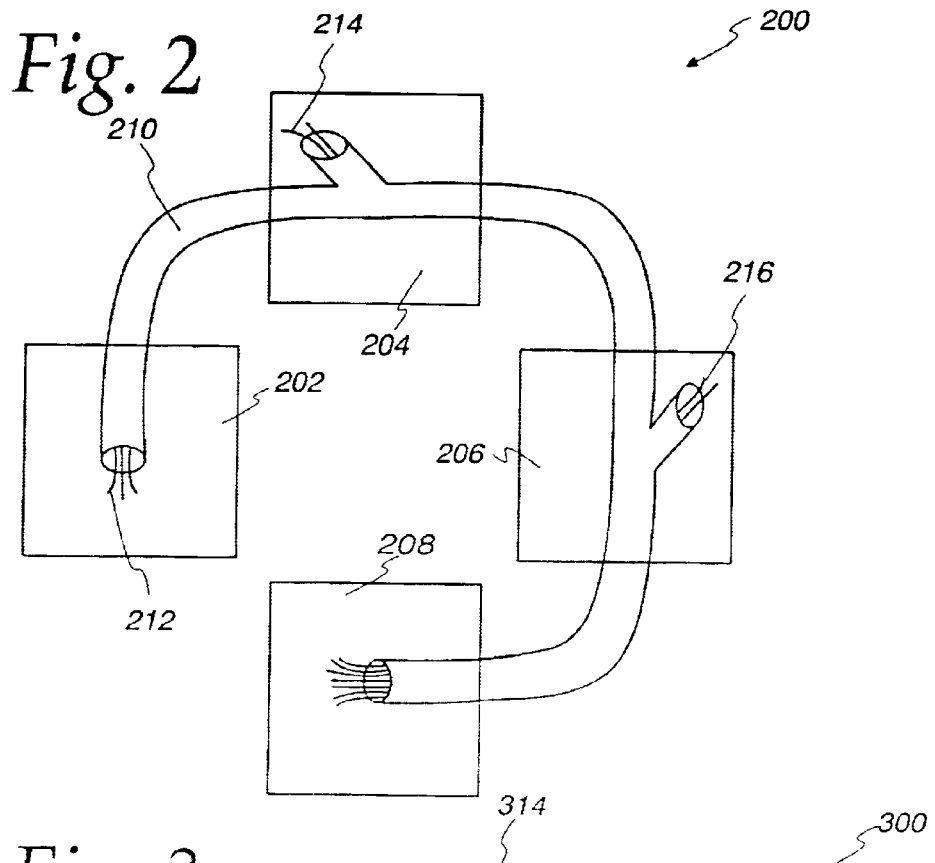
FIG. 2 illustrates a schematic diagram of an arrangement of distributed virtual paths within an ATM network.

FIG. 2 shows an arrangement of virtual paths within an ATM network 200 connecting network elements 202, 204, 206 and 208. The figure also shows a new type of virtual path, discussed below: a distributed virtual path (DVP) 210. Virtual circuits 212, 214 and 216 are also illustrated.

Figure 1:
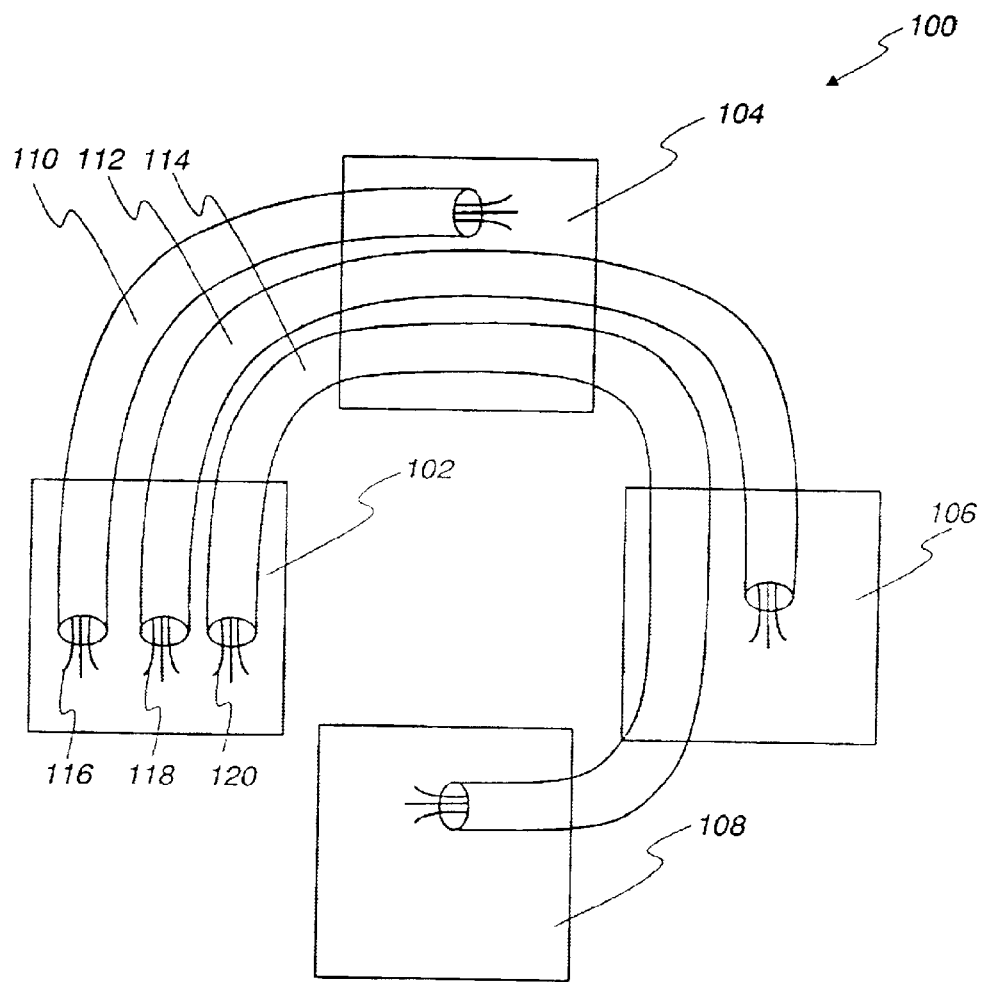
FIG. 1 illustrates a schematic diagram of a conventional arrangement of virtual paths within an ATM network.

Consider the DVP 210, running from the source network element 202 through the intermediate network elements 204 and 206, and terminating on the destination network element 208. The DVP 210 carries virtual circuits that connect the source network element 202 to the destination network element 208. The DVP 210 differs from the traditional concept of a virtual path (discussed above in conjunction with FIG. 1), in that it allows the intermediate network elements 204 and 206 to add virtual circuits to it as it passes from the source network element 202 to the destination network element 208.

To illustrate this important difference between a DVP and a traditional virtual path, consider the DVP 210. Both the DVP 210 and a traditional virtual path may contain a virtual circuit analogous to the virtual circuit 212. The virtual circuit 212 enters the DVP 210 at the source network element 202 and leaves the DVP 210 at the destination network element 208. However, a traditional virtual path would not carry the virtual circuits 214 and 216. These virtual circuits are added to the DVP 210 by the intermediate network elements 204 and 206, respectively. In a system implementing traditional virtual paths, two additional virtual paths (distinct from the virtual path 210 and from each other) would be required to carry each of the virtual circuits 214 and 216. These additional virtual paths are not required in a network using DVPs. The resultant advantages are discussed below.

A second difference between the virtual path 210 and a traditional virtual path is that the virtual path 210 is preferably unidirectional. In other words, traffic is generally not carried in a backward direction to a source network element, such as the network element 202. The virtual path 210 may be considered to contain all traffic destined for the destination network element 208.

When a DVP is used, the destination network element, in this case the destination network element 208 of the DVP 210, preferably handles bandwidth allocation. One primary reason is that the destination network element sees the full amount of traffic being carried by the virtual path.

Allowing the destination network element of a DVP to manage bandwidth greatly reduces the number of virtual paths required to fully connect the network elements. The number of virtual paths required to fully connect a network using DVPs is $X*N$, where X is the number of QoS classes defined for the network and N is the number of network elements in the network. When using DVPs, the total number of virtual paths becomes a linear function of the number of network elements in the network.

A significant improvement is thus realized over the second order relationship of previous virtual path arrangements. Even for moderately sized networks, where N may be on the order of one hundred, the use of DVPs provide a substantial reduction in the total number of virtual paths required for full connectivity. The reduction in the number of virtual paths greatly reduces the complexity of network administration.

Furthermore, the use of DVPs decreases the number of virtual paths running between adjacent network elements. When using DVPs, the number of virtual paths running between each pair of adjacent network elements is $X*(N-1)$. Each virtual path may therefore receive a greater portion of the available bandwidth and bandwidth fragmentation is greatly reduced. As discussed above, reduced bandwidth fragmentation improves the ability of each network element to perform statistical multiplexing.

Furthermore, using DVPs may also increase the efficiency of call setup when the network elements are arranged in a ring. Since the terminal network element of a DVP has a view of all of the traffic destined for it, that network element knows the availability of the total bandwidth coming into it. Any network element that needs to send cells to the terminal network element may signal that terminal network element directly to determine if enough bandwidth is available to set up the call.

Figure 3:
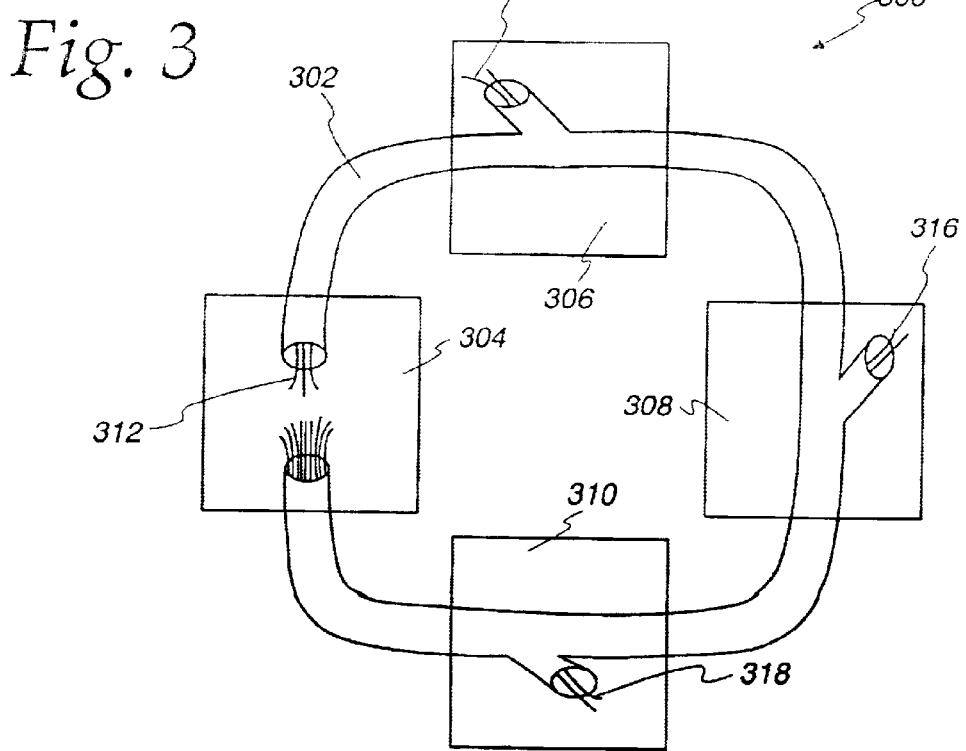
FIG. 3 illustrates a schematic diagram of a second embodiment of an arrangement of distributed virtual paths within an ATM network.

Turning now to FIG. 3, that figure shows another embodiment of a DVP 302 used within an ATM network 300 to connect network elements 304, 306, 308 and 310. Virtual circuits 312, 314, 316 and 318 are also illustrated.

Consider the virtual path 302, running from the source network element 304 through the intermediate network elements 306, 308 and 310, and terminating back on the source network element 304. The virtual path 302 carries virtual circuits that connect the source network element 304 to itself, for example, virtual circuit 312. The virtual path 302 differs from the traditional concept of a virtual path (discussed above in conjunction with FIG. 1), in that it allows the intermediate network elements 306, 308 and 310 to add virtual circuits to it as it passes from the source network element 304, through the intermediate network elements 306, 308 and 310, and then back to the source network element 304.

Both the DVP 302 and a traditional virtual path may contain a virtual circuit analogous to the virtual circuit 312. The virtual circuit 312 enters the DVP 302 at the source network element 304 and leaves the DVP 302 at the source network element 304. However, a traditional virtual path cannot carry the virtual circuits 314, 316 and 318. These virtual circuits are added to the DVP 302 by the intermediate network elements 306, 308 and 310, respectively. In a system implementing traditional virtual paths, three additional virtual paths (distinct from the virtual path 302 and from each other) are required to carry each of the virtual circuits 314, 316 and 318. These additional virtual paths are not required in a network using DVPs.

In the embodiment shown in FIG. 3, the DVP 302 starts and ends at the same network element, in this case the network element 304, forming a complete ring within the network. The complete ring arrangement allows the network element 304 to receive transmissions from the other network elements 306, 308 and 310, and from itself. The network element 304 may therefore send operations, administrative and maintenance (OAM) cells to itself. Furthermore, the intermediate network elements 306, 308 and 310 may inject OAM cells into toe DVP 302 to be received by the source network element 304. The ability of network elements to send OAM cells to each other and themselves provides a way to monitor network performance and localize problems (such as breaks in the ring) when such problems arise.

The present invention thus overcomes many limitations found in prior arrangements of virtual paths within an ATM network. The present invention provides for decreased administrative complexity. It also provides decreased bandwidth fragmentation, allowing for improved statistical multiplexing efficiency.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A network topology for an ATM network, the network topology comprising:

a source network element;

at least one intermediate network element; and a distributed virtual path connecting the source network element and the at least one intermediate network element, the distributed virtual path including a virtual circuit originating from the source network element and a virtual circuit originating from the at least one intermediate network element, the distributed virtual path originating from the source network element and terminating at the source network element and being arranged to transmit from the source network element at least one of operations, administrative and maintenance cells and arranged to receive at the source network element transmissions of at least one of the operations, administrative and maintenance cells from the source network element and transmissions from the at least one intermediate network element, the source network element being arranged to monitor at least one of the operations, administrative and maintenance cells received from the source network element.

2. The network topology of claim 1, wherein at least one of the network elements is a computer.

3. The network topology of claim 1, wherein at least one of the network elements is a satellite.

4. The network topology of claim 1, wherein the distributed virtual path is unidirectional.

5. A method of arranging distributed virtual paths within an ATM network, the method comprising:

establishing a source network element for a distributed virtual path;

establishing at least one intermediate network element for the distributed virtual path;

connecting the source network element to the at least one intermediate network element using the distributed virtual path;

establishing a virtual circuit originating from the source network element;

establishing a virtual circuit originating from the at least one intermediate network element;

connecting the distributed virtual path back to the source network element;

originating transmissions of at least one of operations, administrative and maintenance cells at the source network element;

originating transmissions from the at least one intermediate network element;

receiving at the source network element the transmissions of at least one of the operations, administrative and maintenance cells originating at the source network element;

receiving at the source network element the transmissions originating at the at least one intermediate network element, and;

monitoring at the source network element the at least one of the operations, administrative and maintenance cells received from the source network.

6. The method of claim 5, wherein the step of connecting further comprises connecting to at least one computer.

7. The method of claim 5, wherein the step of connecting further comprises connecting to at least one satellite.

8. A distributed virtual path comprising:

a virtual path including a virtual circuit originating from a source network element and a virtual circuit originating from at least one intermediate network element, the distributed virtual path originating from the source network element, terminating at the source network element, and being arranged to transmit from the source network element at least one of operations, administrative and maintenance cells and arranged to receive at the source network element transmissions of at least one of the operations, administrative and maintenance cells originating from the source network element and transmissions originating from the at least one intermediate network element, the source network element being arranged to monitor at least one of the operations, administrative and maintenance cells received from the source network element.

9. The distributed virtual path of claim 8, wherein the distributed virtual path is unidirectional.

10. Apparatus for arranging distributed virtual paths within an ATM network comprising:

means for establishing a source network element for a distributed virtual path;

means for establishing at least one intermediate network element for the distributed virtual path;

means for connecting the source network element to the at least one intermediate network element using the distributed virtual path;

means for establishing a virtual circuit originating from the source network element and for establishing a virtual circuit originating from the at least one intermediate network element;

means for connecting the distributed virtual path back to the source network element; and means for originating transmissions of at least one of operations, administrative and maintenance cells at the source network element, for originating transmissions from the at least one intermediate network element, for receiving at the source network element the transmissions of at least one of the operations, administrative and maintenance cells originating at the source network element and for receiving at the source network element the transmissions originating at the at least one intermediate network element, the source network element being arranged to monitor at least one of the operations, administrative and maintenance cells received from the source network element.

* * * * *

UNITED STATES PATENT AND TRADEMARK OFFICE
CERTIFICATE OF CORRECTION

PATENT NO. : 6,721,323 B1
DATED : April 13, 2004
INVENTOR(S) : Eugene F. Giszczynski et al.

It is certified that error appears in the above-identified patent and that said Letters Patent is hereby corrected as shown below:

Title page,
Item [73], Assignee, delete "Tellab" and substitute therefore -- Tellabs --

Signed and Sealed this

Twenty-eighth Day of December, 2004

JON W. DUDAS
*Director of the United States Patent and Trademark Office*